(No Model.)
R. WARD.
CUFF HOLDER.
No. 395,193. Patented Dec. 25, 1888.
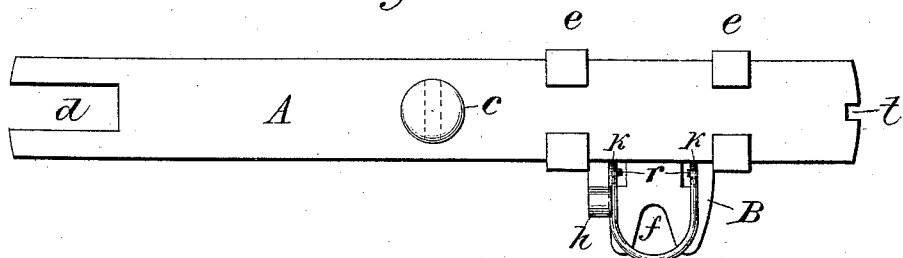
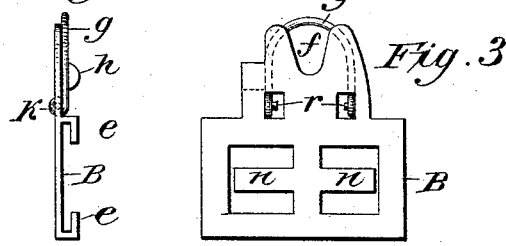
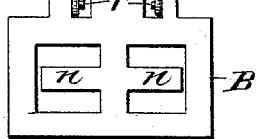
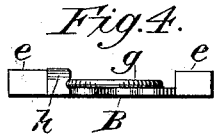
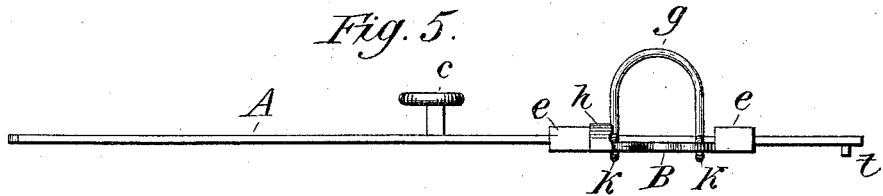
Witnesses:
Edwin M. Cooke
John R. Taylor
Inventor:
Rivera Ward

UNITED STATES PATENT OFFICE.

RIVERA WARD, OF LITTLE FALLS, NEW YORK.

CUFF-HOLDER.

SPECIFICATION forming part of Letters Patent No. 395,193, dated December 25, 1888.

Application filed August 1, 1888. Serial No. 281,706. (No model.)

*To all whom it may concern:*

Be it known that I, RIVERA WARD, a citizen of the United States, residing at Little Falls, in the county of Herkimer and State of New York, have invented a new and useful Adjustable Cuff-Holder, of which the following is a specification.

My invention relates to devices for holding a cuff so that it may be easily adjusted in relation to the wristband of a shirt-sleeve and also form a very secure connection between the cuff and wristband.

Figure 1 in the accompanying drawings represents a plan view of my cuff-holder, and Fig. 5 an edge view of the same with the bail $g$ thrown back. Figs. 2, 3, and 4 are respectively an end, back, and edge view of the plate B with the bail $g$ closed down, as when attached to button of wristband. Fig. 4 is an edge view of plate B and shows how the catch $h$ holds the bail $g$ in position. Fig. 3 is a bottom view of plate B.

A is a bar of suitable thickness, one end being forked at $d$, so that it will straddle the shank of cuff-button.

$c$ is a button, attached to bar A by any suitable means, such as soldering or riveting.

$t$ is a portion of bar A turned down to form a stop, so that A cannot be drawn out of plate B.

B is a plate of sheet metal, with portions $e\ e\ e\ e$ turned over, so as to embrace plate A. Its form is clearly shown by Fig. 2. The plate B is forked at $f$ to straddle the shank of a wristband-button.

$g$ is a bail of spring-wire with ears on its ends. (Shown at $k$, Fig. 6.)

$r\ r$ are bearings that the bail $g$ hinges on, and are formed by cutting away such portions of plate B on three sides of bearings $r$, so that the ears of the bail $g$ can be put on, which is clearly shown at Fig. 3.

$h$ is a portion of plate B turned up, with a shallow notch at its base, into which one side of the bail $g$ springs when it is pressed down to the plate B.

$n\ n$ are springs, formed in the bottom of plate B by cutting away a portion of it on three sides, and are bent so as to press against bar A with the requisite force to hold the bar in any required position.

The manner of using my cuff-holder is as follows: The plate B being at the end of bar A against the stop $t$, the cuff-holder is inserted on the inside of the cuff, the forked end $d$ straddling the shank of the cuff-button and the inner end of cuff buttoned onto the button $c$. The cuff with holder attached is slipped on the arm, and the bail $g$ being thrown up the forked portion of plate B is made to straddle the shank of the wristband-button. The bail $g$, being now pressed down over the wristband-button, is caught and held down by the catch $h$, as shown in Fig. 4. By taking hold of the outer end of the cuff at or near the cuff-button the cuff can be moved in and out and left in any desired position, the bar A sliding on plate B and being retained in position by the pressure of the springs $n\ n$.

What I claim as my invention, and desire to secure by Letters Patent, is—

1. The improved cuff-holder consisting of the bar A, provided with a button and notched at one end and having a stop at the opposite end, and a sliding plate, B, provided with a bail, $g$, all arranged to operate substantially as set forth.

2. In the cuff-holder herein described, the notched bar A, having the button $c$, in combination with the sliding plate B, provided with the bail $g$, and the springs $n$, all substantially as set forth.

RIVERA WARD.

Witnesses:
JOHN R. TAYLOR,
EDWIN M. COOKE.